(12) United States Patent
Shimizu et al.

(10) Patent No.: US 8,398,244 B2
(45) Date of Patent: Mar. 19, 2013

(54) PROJECTOR

(75) Inventors: Toshihiro Shimizu, Matsumoto (JP); Katsumi Tanaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 231 days.

(21) Appl. No.: 12/642,259

(22) Filed: Dec. 18, 2009

(65) Prior Publication Data

US 2010/0165299 A1 Jul. 1, 2010

(30) Foreign Application Priority Data

Dec. 25, 2008 (JP) ................................. 2008-329369

(51) Int. Cl.
G03B 21/14 (2006.01)

(52) U.S. Cl. ................ 353/38; 353/30; 353/31; 353/34; 353/81; 353/98; 353/99; 359/434

(58) Field of Classification Search ..................... 353/20, 353/30, 31, 33, 34, 38, 81, 98, 99, 102, 122, 353/891; 359/641–651, 664, 622, 634, 707, 359/434; 349/7, 8, 9, 30
See application file for complete search history.

(56) References Cited

U.S. PATENT DOCUMENTS

| | | | | |
|---|---|---|---|---|
| 4,758,074 A * | 7/1988 | Yamakawa ..................... 359/650 |
| 5,016,994 A * | 5/1991 | Braat ............................. 359/708 |
| 5,626,409 A | 5/1997 | Nakayama et al. |
| 5,719,706 A * | 2/1998 | Masumoto et al. ........... 359/622 |
| 5,852,479 A * | 12/1998 | Ueda et al. ......................... 349/9 |
| 6,067,193 A * | 5/2000 | Sekine et al. ............ 359/486.02 |
| RE36,850 E | 9/2000 | Nakayama et al. |
| 6,120,152 A | 9/2000 | Nakayama et al. |
| 6,137,635 A * | 10/2000 | Nakazawa ..................... 359/621 |
| 6,309,073 B1 | 10/2001 | Nakayama et al. |
| 6,327,092 B1 * | 12/2001 | Okuyama ...................... 359/634 |
| 6,726,334 B2 * | 4/2004 | Ishino ............................. 353/84 |
| 6,921,176 B2 * | 7/2005 | Tomita et al. ................... 353/94 |
| 7,936,403 B2 * | 5/2011 | Horikoshi et al. ................ 349/9 |
| 8,035,758 B2 * | 10/2011 | Yamauchi et al. ................ 349/9 |
| 2002/0057420 A1 | 5/2002 | Nakayama et al. |
| 2003/0025883 A1 * | 2/2003 | Yajima ............................ 353/38 |
| 2003/0067586 A1 * | 4/2003 | Chigira et al. .................. 353/20 |
| 2003/0147051 A1 * | 8/2003 | Fujita et al. ..................... 353/31 |
| 2004/0212782 A1 * | 10/2004 | Karasawa ....................... 353/20 |
| 2005/0052868 A1 * | 3/2005 | Yamakawa ..................... 362/269 |
| 2007/0273836 A1 * | 11/2007 | Facius et al. .................... 353/20 |
| 2008/0165407 A1 | 7/2008 | Ishibashi et al. |

FOREIGN PATENT DOCUMENTS

| | | |
|---|---|---|
| JP | 11-311762 A | 11/1999 |
| JP | A-2001-215615 | 8/2001 |
| JP | A-2007-57810 | 3/2007 |
| JP | A-2008-165136 | 7/2008 |

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

A projector includes: a light source that emits light; a first lens array that divides the light emitted from the light source into a plurality of partial light beams; a second lens array that focuses the plurality of partial light beams emitted from the first lens array; condenser lenses that superimpose the plurality of partial light beams emitted from the second lens array on target illumination regions; and liquid crystal panels that modulate the light beams passing through the condenser lenses according to image information, wherein each of the condenser lenses is a single lens that achieves telecentric illumination when superimposing the partial light beams, and only the condenser lenses are arranged as lenses between the second lens array and the liquid crystal panels.

20 Claims, 3 Drawing Sheets

PROJECTOR

This application claims priority to JP 2008-329369 filed in Japan on Dec. 25, 2009, the entire disclosure of which is hereby incorporated by reference in its entirety.

BACKGROUND

1. Technical Field

The present invention relates to a projector that modulates illumination light using liquid crystal light valves and projects the modulated image light.

2. Related Art

General projectors according to the related art include a light source that generates substantially white light, an illumination optical system that makes the light emitted from the light source uniform and polarizes the light, a color separation optical system that separates the light passing through the illumination optical system and guides the separated light onto three green, blue, and red optical paths, three liquid crystal panels on which three color illumination light components are incident, a cross dichroic prism that composes images from the three liquid crystal panels, and a projection lens that projects the composed enlarged light.

A projector has been proposed in which the F-number of an illumination optical system is reduced to improve the brightness of light without increasing the size of the illumination optical system. In the projector, a condenser lens is provided between a superimposing lens and a liquid crystal light valve, and telecentricity is obtained by the condenser lens. In this way, it is possible to remove a field lens provided before the liquid crystal light valve (for example, see JP-A-2008-165136).

In addition, a projector has been proposed in which a field lens is provided after a polarizing element in an illumination optical system and a condenser lens is provided before a first dichroic mirror in a color separation optical system (for example, see JP-A-2007-57810).

However, in the projector disclosed in JP-A-2008-165136, the size of the condenser lens tends to be larger than that when the field lens is provided. Therefore, the manufacturing costs of the projector tend to be more than those of a general projector according to the related art.

In the projector disclosed in JP-A-2007-57810, although the number of lenses added is one smaller than that of the projector disclosed in JP-A-2008-165136, a lens superimposing divided light and a lens ensuring telecentricity are individually provided. Therefore, it is difficult to ensure brightness while reducing manufacturing costs.

SUMMARY

An advantage of some aspects of the invention is to provide a projector capable of reducing the F-number of an illumination optical system to improve brightness without increasing the size of the illumination optical system or without complicating the structure thereof.

According to an aspect of the invention, a projector includes: a light source that emits source light; a first lens array that divides the source light emitted from the light source into a plurality of partial light beams; a second lens array that focuses the plurality of partial light beams emitted from the first lens array; condenser lenses that superimpose the plurality of partial light beams emitted from the second lens array on target illumination regions; and liquid crystal panels that modulates the light beams passing through the condenser lenses according to image information. Each of the condenser lenses is a single lens that achieves telecentric illumination when superimposing the partial light beams, and only the condenser lenses are arranged as lenses between the second lens array and the liquid crystal panels.

In the projector, since the condenser lens is a single lens that can superimpose the divided light beams and is telecentric, it is possible to reduce the number of parts of the projector. Therefore, it is possible to reduce the manufacturing costs and size of the projector. In addition, since the number of lenses is small, it is possible to easily design, for example, fixed members for lenses. Further, only the condenser lens is arranged as a lens on the optical path from the second lens array to the liquid crystal panels. Therefore, when the condenser lens is arranged at a position away from the second lens array and diverging light emitted from the second lens array is incident on the liquid crystal panel at a large incident angle, the focal length of the condenser lens is reduced. As a result, it is possible to reduce the F-number and thus easily improve the brightness of illumination light.

In the projector according to the above-mentioned aspect, when the length of an optical path from an emission-side surface of the second lens array to a light modulation surface of each of the liquid crystal panels is divided into three equal parts, each of the condenser lenses may be arranged in a middle part. Specifically, when the distance from an emission-side surface of the second lens array to a light modulation surface of the liquid crystal panel is L, the condenser lens is arranged at a position in the range of $(1/3)L$ to $(2/3)L$. In this way, it is relatively easy to reduce the F-number of the illumination optical system or ensure the telecentricity of the illumination optical system.

The projector according to the above-mentioned aspect may further include: a color separation light guide optical system including a first color separation mirror that separates the light beams emitted from the second lens array into a first color light component and other color light components, a second color separation mirror that separates other color light components into a second color light component and a third color light component, a first reflecting mirror that reflects the first color light component reflected by the first color separation mirror to bend an optical path, and second and third reflecting mirrors that reflect the third color light component passing through the second color separation mirror to bend an optical path. The condenser lenses may be arranged between the first color separation mirror and the first reflecting mirror and between the first color separation mirror and the second color separation mirror. In this case, when the length of the optical path from the emission-side surface of the second lens array to the light modulation surface of the liquid crystal panel is divided into three equal parts, the condenser lens is reliably arranged in the middle part. In this way, the F-number of the illumination optical system is reduced relatively easily. Therefore, it is possible to easily ensure the telecentricity of the illumination optical system.

The projector according to the above-mentioned aspect may further include: a color separation light guide optical system including a first-stage reflecting mirror that reflects the light beams emitted from the second lens array to bend an optical path, a first color separation mirror that separates the light beams reflected by the first-stage reflecting mirror into a first color light component and other color light components, a second color separation mirror that separates other color light components into a second color light component and a third color light component, a first reflecting mirror that reflects the first color light component reflected by the first color separation mirror to bend an optical path, and second and third reflecting mirrors that reflect the third color light component passing through the second color separation mirror to bend an optical path. The condenser lens may be arranged between the first-stage reflecting mirror and the first color separation mirror. In this case, when the length of the optical path from the emission-side surface of the second lens array to the light modulation surface of the liquid crystal panel is divided into three equal parts, the condenser lens is easily arranged in the middle part. In this way, the F-number of the illumination optical system is reduced relatively easily. Therefore, it is possible to easily ensure the telecentricity of the illumination optical system.

The projector according to the above-mentioned aspect may further include: first, second, and third liquid crystal panels that respectively modulate the first, second, and third color light components separated by the color separation light guide optical system according to image information; a light composition optical system that composes the images of the first, second, and third color light components modulated by the first, second, and third liquid crystal panels; and a projection optical system that projects the image light composed by the light composition optical system. In this case, it is possible to integrate the optical paths of the color light components separated by the first and second color separation mirrors. Therefore, it is possible to compose modulated light components passing through the optical paths of the color light components to form projection light.

In the projector according to the above-mentioned aspect, the color separation light guide optical system may further include a relay lens that is provided on the optical path of the third color light component having the largest length. In this case, since the relay lens is provided on the optical path of the third color light component having the largest length, it is possible to prevent the use efficiency of light from being reduced due to, for example, the diffusion of light.

In the projector according to the above-mentioned aspect, each of the condenser lenses may be a biconvex lens. When the condenser lens is a biconvex lens, it is possible to reduce spherical aberration. In addition, it is possible to freely set the position of the edge of a lens (a side surface of the outer circumference of a lens) by adjusting the curvatures of both lens surfaces. As a result, flexibility in the setting of a mechanism for fixing the condenser lens is improved.

In the projector according to the above-mentioned aspect, each of the condenser lenses may be an aspheric lens. When the condenser lens is an aspheric lens, spherical aberration is reduced and superimposing is reliably performed. Therefore, the brightness of illumination light improved.

In the projector according to the above-mentioned aspect, each of the condenser lenses may be a spherical lens. When the condenser lens is a spherical lens, it is possible to reduce manufacturing costs.

BRIEF DESCRIPTION OF THE DRAWINGS

The invention will be described with reference to the accompanying drawings, wherein like numbers reference like elements.

DETAILED DESCRIPTION OF EMBODIMENTS

First Embodiment

Figure 1:
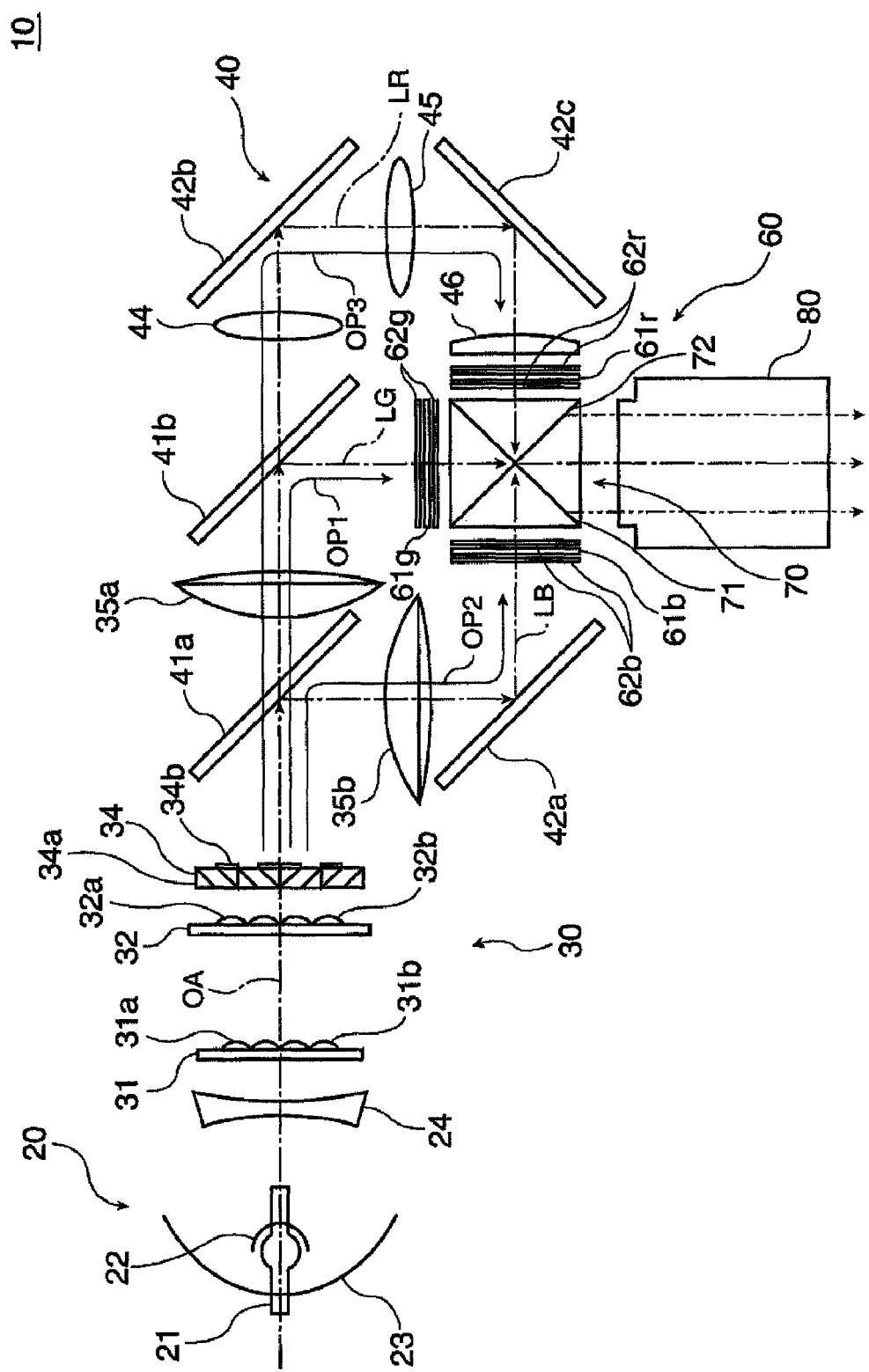
FIG. 1 is a conceptual diagram illustrating the structure of a projector according to a first embodiment of the invention.

FIG. 1 is a conceptual diagram illustrating the structure of an optical system of a projector according to a first embodiment of the invention.

A projector 10 is an optical apparatus that modulates light beams emitted from a light source according to image information to form a color optical image and enlarges and projects the optical image onto a screen. The projector 10 includes a light source lamp unit 20, an illumination optical system 30, a color separation light guide optical system 40, a light modulating unit 60, a cross dichroic prism 70, and a projection optical system 80. The light source lamp unit 20 and the illumination optical system 30 form an illuminating device that generates illumination light to be incident on, for example, the color separation light guide optical system 40. First, second, and third optical paths OP1, OP2, and OP3 that respectively guide green light LG, blue light LB, and red light LR are provided between the illumination optical system 30 and the cross dichroic prism 70.

The light source lamp unit 20 is a light source that focuses light beams emitted from a lamp body 21 and emits the focused light to illuminate the light modulating unit 60 through the illumination optical system 30. The light source lamp unit 20 includes the lamp body 21, which is a light-emitting tube, a spherical secondary mirror 22 that reflects the source light emitted forward by the lamp body 21, an ellipsoidal primary mirror 23 that reflects the source light emitted backward by the lamp body 21, and a concave lens 24 for collimation. In the light source lamp unit 20, substantially white source light emitted from the lamp body 21 is incident on the primary mirror 23 directly or through the secondary mirror 22 and is then reflected to the front side. The light is changed into parallel light by the concave lens 24 and is then emitted to the illumination optical system 30. A high-pressure mercury lamp is generally used in the lamp body 21 since it can emit high-brightness light in the wavelength range of each color light. However, a lamp that can be incorporated into the light source lamp unit 20 is not limited to the high-pressure mercury lamp, but various kinds of light-emitting lamps may be used. Solid-state light-emitting elements, such as LEDs, may also be used. The shape of the reflection surface of the primary mirror 23 is not limited to an ellipsoid, but various kinds of reflectors having, for example, a paraboloidal reflecting surface may be used. When the paraboloidal primary mirror 23 is used, it is possible to emit parallel light beams from the light source lamp unit 20 without providing the concave lens 24 after the primary mirror 23.

The illumination optical system 30 is an optical system that divides a light beam emitted from the light source lamp unit 20 into a plurality of partial light beams and polarizes illumination light in a specific direction. The illumination optical system 30 includes a first lens array 31, a second lens array 32, a polarization converter 34, and first and second condenser lenses 35a and 35b.

The first lens array 31 is also called a multi-lens, and serves as a light beam separation optical element that divides the light beam emitted from the lamp body 21 into a plurality of partial light beams. The first lens array 31 includes a plurality of small lenses 31a arranged in a matrix in the plane that is orthogonal to a system optical axis OA. The contour shape of each of the small lenses 31a is substantially the same as those of image forming regions of first, second, and third liquid crystal panels 61g, 61b, and 61r of the light modulating unit 60, which will be described below. The second lens array 32 is an optical element that focuses the plurality of partial light beams divided by the first lens array 31. The second lens array 32 includes a plurality of small lenses 32a arranged in a matrix in the plane that is orthogonal to the system optical axis OA, similar to the first lens array 31. However, since the second lens array 32 is for focusing light, the contour shape of each of the small lenses 32a does not need to exactly correspond to the shape of the image forming region of each of the first, second, and third liquid crystal panels 61g, 61b, and 61r. The magnification of the illumination system is mainly determined by the first and second lens arrays 31 and 32, and the image of the light source is formed in the vicinity of the second lens array 32. That is, the image of the light source in the lamp body 21 is projected in the vicinity of each of the small lenses 32a of the second lens array 32. The images of the lenses 31a of the first lens array 31 are projected onto the first, second, and third liquid crystal panels 61g, 61b, and 61r. The above-mentioned first and second lens arrays 31 and 32 and the first and second condenser lenses 35a and 35b, which will be described below, serve as a light integrator that divides and superimposes incident light to make the in-plane illuminance of the image forming region of each of the first, second, and third liquid crystal panels 61g, 61b, and 61r substantially uniform.

The polarization converter 34 includes a PBS (polarizing beam splitter) array 34a and a retardation plate 34b, and linearly polarizes the partial light beams divided by the first lens array 31 in one direction. The PBS array 34a (not shown in detail) of the polarization converter 34 has a structure in which polarizing films and reflecting mirrors arranged obliquely with respect to the system optical axis OA are alternately arranged at predetermined intervals in a direction vertical to the system optical axis OA. The polarizing film transmits one of P-polarized light and S-polarized light included in each partial light beam and reflects the other polarized light. The reflected polarized light is reflected by the reflecting mirror and is then emitted in the emission direction of the transmitted polarized light, that is, a direction aligned with the system optical axis OA. One of the emitted P-polarized light and the emitted S-polarized light is polarized by the retardation plate 34b that is provided in a stripe shape on a light beam emission surface of the polarization converter 34 such that the polarization directions of the P-polarized light and the S-polarized light are aligned with each other. The use of the polarization converter 34 enables light passing through the polarization converter 34 to be polarized in one direction. Therefore, it is possible to improve the use efficiency of the source light used in the light modulating unit 60.

The first and second condenser lenses 35a and 35b are, for example, biconvex lenses each having an aspheric surface on an incident side. Each of the first and second condenser lenses 35a and 35b is a single lens that is telecentric and superimposes the light beams divided by the first lens array 31. For example, BK7 (refractive index: 1.5) having a low refractive index and low dispersion is used as the first and second condenser lenses 35a and 35b. Since the first and second condenser lenses 35a and 35b are provided in the color separation light guide optical system 40, the functions of the first and second condenser lenses 35a and 35b will be described in detail in the description of the color separation light guide optical system 40.

The color separation light guide optical system 40 includes first and second dichroic mirrors 41a and 41b, a reflecting mirror 42a for blue, reflecting mirrors 42b and 42c for red, relay lenses 44 and 45, and a field lens 46. Among them, the first and second dichroic mirrors 41a and 41b are color separation mirrors that separate substantially white illumination light into three primary colors. Each of the dichroic mirrors 41a and 41b is an optical element obtained by forming on a transparent substrate a dielectric multi-layer film having a wavelength selecting function of reflecting light beams in a predetermined wavelength range and transmitting light beams in the other wavelength ranges. The dichroic mirrors 41a and 41b are arranged obliquely with respect to the system optical axis OA. The first dichroic mirror 41a, which is a first color separation mirror, reflects the blue light LB among three color light components, that is, green, blue, and red (G, B, and R) light components, and transmits the green light LG and the red light LR. The second dichroic mirror 41b, which is a second color separation mirror, reflects the green light LG of the incident green light LG and red light LR and transmits the red light LR. That is, illumination light that has been emitted from the light source lamp unit 20 and then incident on the color separation light guide optical system 40 through the illumination optical system 30 is separated into the blue light LB that is reflected by the first dichroic mirror 41a to be guided to the second optical path OP2, the green light LG that transmits the first dichroic mirror 41a and is reflected by the second dichroic mirror 41b to be guided to the first optical path OP1, and the red light LR that transmits the first and second dichroic mirrors 41a and 41b and is guided to the third optical path OP3.

The first and second condenser lenses 35a and 35b provided on the rear side of the first dichroic mirror 41a focus a plurality of partial light beams passing through the first lens array 31, the second lens array 32, and the polarization converter 34 of the illumination optical system 30 so as to be superimposed and incident on the image forming regions of the first, second, and third liquid crystal panels 61g, 61b, and 61r. In this case, the illumination light passing through the two lens arrays 31 and 32 passes through the first and second condenser lenses 35a and 35b such that the states of the light beams are adjusted, and the adjusted light beams are superimposed on the illumination region of the light modulating unit 60, that is, the image forming regions of the liquid crystal panels 61g, 61b, and 61r for the green, blue and red light components LG, LB, and LR with uniform brightness. The F-number of each of the first and second condenser lenses 35a and 35b with respect to the optical paths OP1, OP2, and OP3 of the illumination optical system 30 is reduced to be equal to or smaller than a predetermined value by adjusting the arrangement, the focal lengths, or the diameters of the first and second condenser lenses. In this way, the telecentricity of the illumination optical system 30 is ensured.

The first condenser lens 35a is provided between the first dichroic mirror 41a and the second dichroic mirror 41b in the first optical path OP1 from an emission-side surface 32b of the second lens array 32 to the first liquid crystal panel 61g. In addition, no lens is provided between the emission-side surface 32b of the second lens array 32 and the first dichroic mirror 41a or between the second dichroic mirror 41b and the first liquid crystal panel 61g. From another point of view, when a distance $L_1$ from the emission-side surface 32b of the second lens array 32 to the image forming region of the first liquid crystal panel 61g, that is, a light modulation surface of the first liquid crystal panel 61g is divided into three equal parts, the first condenser lens 35a is disposed in the middle part (specifically, in the range of $(\frac{1}{3})L_1$ to $(\frac{2}{3})L_1$). The first condenser lens 35a provided on a transmission optical path of the first dichroic mirror 41a is provided on both the third optical path OP3 and the first optical path OP1.

The second condenser lens 35b is provided between the first dichroic mirror 41a and the blue light reflecting mirror 42a, which is a first reflecting mirror, in the second optical path OP2 from the emission-side surface 32b of the second lens array 32 to the second liquid crystal panel 61b. In addition, no lens is provided between the emission-side surface 32b of the second lens array 32 to the first dichroic mirror 41a, or between the blue color reflecting mirror 42a and the second liquid crystal panel 61b. From another point of view, when a distance $L_2$ from the emission-side surface 32b of the second lens array 32 to the image forming region of the second liquid crystal panel 61b, that is, a light modulation surface of the second liquid crystal panel 61b is divided into three equal parts, the second condenser lens 35b is disposed in the middle part (specifically, in the range of $(1/3)L_2$ to $(2/3)L_2$).

A pair of relay lenses 44 and 45 and the field lens 46 are provided after the second dichroic mirror 41b in the third optical path OP3. The pair of relay lenses 44 and 45 transmits the image formed immediately before the incident-side first relay lens 44 to the emission-side field lens 46 with little change, thereby preventing the use efficiency of light from being reduced due to, for example, the diffusion of light. That is, the two relay lenses 44 and 45 compensate that the third optical path OP3 for red is relatively longer than the first optical path OP1 for green or the second optical path OP2 for blue. The reflecting mirrors 42b and 42c for red, which are second and third reflecting mirrors, sequentially reflect the red light LR passing through the first and second dichroic mirrors 41a and 41b to be guided to the third liquid crystal panel 61r by reflecting twice.

Figure 2:
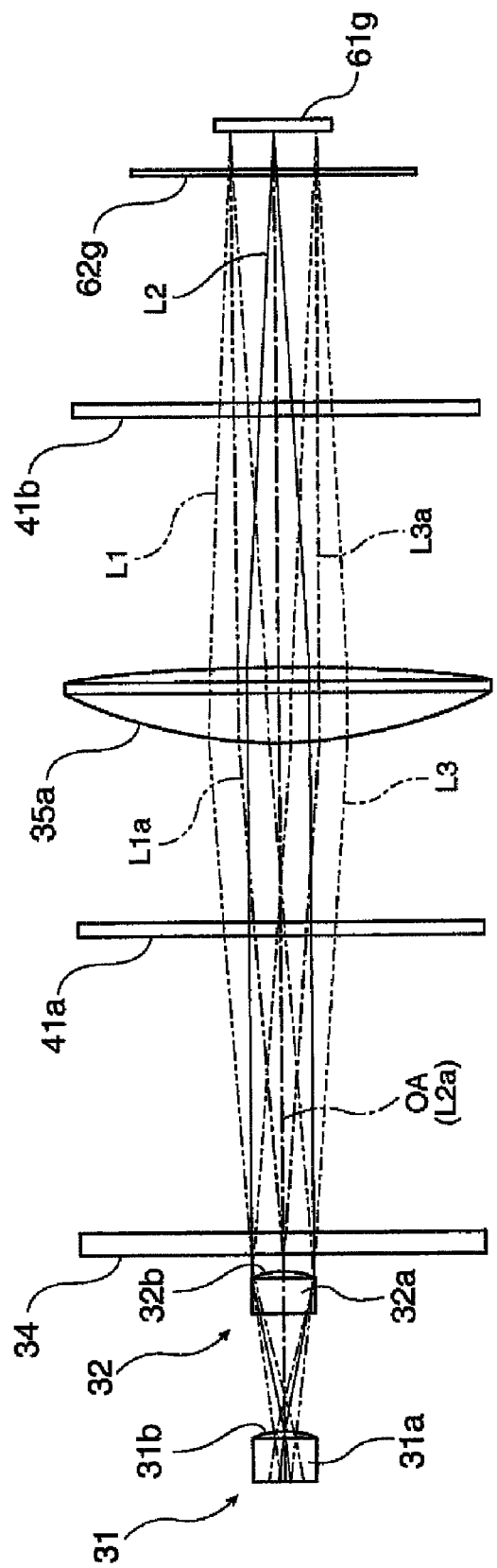
FIG. 2 is a development view illustrating the arrangement and an image forming operation of a first condenser lens shown in FIG. 1.

FIG. 2 is a development view conceptually illustrating the arrangement and an image forming operation of the first condenser lens 35a shown in FIG. 1. For convenience of explanation, FIG. 2 shows the state of light beams when the first optical path OP1 is replaced with a linear optical path except for the reflection of light by the second dichroic mirror 41b on the first optical path OP1. For convenience of explanation, this embodiment will be described in unit of the small lenses 31a and 32a.

As shown in FIG. 2, the first condenser lens 35a is a telecentric lens. Therefore, on the emission side of the first condenser lens 35a, among light beams L2 emitted from the central point of the emission-side surface 31b of the small lens 31a in the first lens array 31, a main light beam L2a that is parallel to the system optical axis OA is incident on the first liquid crystal panel 61g. Similarly, among light beams L1 and L3 emitted from points other than the central point of the emission-side surface 31b, main light beams L1a and L3a that are parallel to the system optical axis OA are incident on the first liquid crystal panel 61g. That is, an optical system including the first condenser lens 35a and the small lens 32a is telecentric. Consequently, the partial light beams divided by the small lens 31a are incident on the first liquid crystal panel 61g while being substantially in parallel to the central main light beam L2a. The light beams L1, L2, and L3 emitted from the corresponding points on the emission-side surface 31b of the small lens 31a pass through the small lens 32a and the first condenser lens 35a and are then incident on the image forming region of the first liquid crystal panel 61g such that the image of the small lens 31a is formed on the image forming region.

The light beam passing through a single small lens 31a on the system optical axis OA in the first lens array 31 has been described above. The light beams passing through the other small lenses (not shown) out of the system optical axis OA form images in the same way as described above. That is, the telecentric optical system projects the image of each of the small lenses 31a in the first lens array 31 onto the first liquid crystal panel 61g, and the partial light beams divided by each small lens 31a are incident on the first liquid crystal panel 61g while being substantially in parallel to their main light beams. Although not shown in the drawings, the main light beam has a predetermined angle with respect to the system optical axis OA so as to correspond to the arrangement of the small lenses. When the partial light beams are incident on the first liquid crystal panel 61g, the central main light beam (not shown) among the partial light beams passing through the small lenses other than the small lens 31a on the system optical axis OA in the first lens array 31 intersects the main light beam L2a among the partial light beams divided by the small lens 31a on the system optical axis OA on the first liquid crystal panel 61g since it is inclined on the first liquid crystal panel 61g so as to correspond to the arrangement of the small lenses, that is, deviation from the system optical axis OA. Therefore, the partial light beams divided by each small lens 31a are superimposed on the first liquid crystal panel 61g. As a result, it is possible to achieve superimposed illumination with telecentricity in the entire illumination optical system 30. This situation is achieved by arranging the second lens array 32 of the illumination optical system 30 in the vicinity of the front-side focal point of the first condenser lens 35a and arranging the first liquid crystal panel 61g in the vicinity of the rear-side focal point of the first condenser lens 35a.

The second condenser lens 35b has the same arrangement and image forming operation as those of the first condenser lens 35a.

Returning to FIG. 1, the light modulating unit 60 includes three liquid crystal panels 61g, 61b, and 61r on which three color illumination light components LG, LB, and LR are respectively incident. The first liquid crystal panel 61g for the green light LG and a pair of polarizing filters 62g and 62g having the first liquid crystal panel 61g interposed therebetween form a green liquid crystal light valve that two-dimensionally modulates the brightness of illumination light on the basis of image information. The second liquid crystal panel 61b for the blue light LB and a pair of polarizing filters 62b and 62b having the second liquid crystal panel 61b interposed therebetween form a blue liquid crystal light valve, Similarly, the third liquid crystal panel 61r for the red light LR and a pair of polarizing filters 62r and 62r having the third liquid crystal panel 61r interposed therebetween form a red liquid crystal light valve. Each of the liquid crystal panels 61g, 61b, and 61r includes a pair of transparent glass substrates and liquid crystal, which is an electro-optical material, injected and sealed therebetween. For example, each of the liquid crystal panels 61g, 61b, and 61r modulates the polarization direction of polarized light incident thereon on the basis of image signals applied, using a polysilicon TFT as a switching element.

The green light LG guided to the first optical path OP1 is incident on the image forming region of the first liquid crystal panel 61g through the first dichroic mirror 41a, the first condenser lens 35a, and the second dichroic mirror 41b. The blue light LB guided to the second optical path OP2 is incident on the image forming region of the second liquid crystal panel 61b through the first dichroic mirror 41a, the second condenser lens 35b, and the reflecting mirror 42a for blue. The red light LR guided to the third optical path OP3 is incident on the image forming region of the third liquid crystal panel 61r through the first dichroic mirror 41a, the first condenser lens 35a, the second dichroic mirror 41b, the relay lenses 44 and 45, the reflecting mirrors 42b and 42c for red, and the field lens 46.

Each of the liquid crystal panels 61g, 61b, and 61r is a non-emission transmissive light modulating device that changes the spatial distribution of the polarization direction of illumination light. The polarization states of the color light components LG, LB, and LR that are respectively incident on the pixels of the liquid crystal panels 61g, 61b, and 61r are adjusted according to driving signals or control signals that are input as electrical signals to the liquid crystal panels 61g, 61b, and 61r. In this case, the polarization direction of illumination light incident on each of the liquid crystal panels 61g, 61b, and 61r is adjusted by the polarizing filters 62g, 62b, and 62r, and modulated light polarized in a predetermined direction is extracted from the light emitted from each of the liquid crystal panels 61g, 61b, and 61r by the polarizing filters 62g, 62b, and 62r.

The cross dichroic prism 70 is a light composition optical system that composes the optical images modulated for the color light components LG, LB, and LR emitted from the polarizing filter 62g, 62b, and 62r to form a color image. The cross dichroic prism 70 has a substantially square shape in a plan view and is obtained by bonding four right angle prisms. In the cross dichroic prism 70, a pair of dielectric multi-layer films 71 and 72 intersecting each other in an X shape is formed on the interface between the right angle prisms. The first dielectric multi-layer film 71 reflects the red light LR, and the second dielectric multi-layer film 72 reflects the blue light LB. In the cross dichroic prism 70, the first dielectric multi-layer film 71 reflects the red light LR emitted from the third liquid crystal panel 61r and ejects to the left side in the traveling direction of the light. The green light LG emitted from the first liquid crystal panel 61g passes straight through the first and second dielectric multi-layer films 71 and 72, and the second dielectric multi-layer film 72 reflects the blue light LB emitted from the second liquid crystal panel 61b and ejects to the right side in the traveling direction of the light.

The image light composed by the cross dichroic prism 70 in this way passes through the projection optical system 80, serving as an enlargement and projection lens, is enlarged at an appropriate enlargement ratio and is then projected as a color image onto a screen (not shown).

In the projector 10 according to the above-described embodiment, since each of the first and second condenser lenses 35a and 35b is a single lens that is telecentric and has a function of superimposing light beams, the number of parts of the projector 10 is reduced, and it is possible to reduce the size and cost of an apparatus. In addition, since the number of lenses in the projector 10 is small, it is possible to easily design, for example, fixed members for lenses. Only the first condenser lens 35a and the second condenser lens 35b are respectively provided as lenses between the emission-side surface 32b of the second lens array 32 and the first and second liquid crystal panels 61g and 61b in the first and second optical paths OP1 and OP2, (specifically, the first condenser lens 35a is provided at a position spaced a distance of $(1/3)L_1$ to $(2/3)L_1$ from the emission-side surface 32b of the second lens array 32 in the first optical path OP1, and the second condenser lens 35b is provided at a position spaced a distance of $(1/3)L_2$ to $(2/3)L_2$ from the emission-side surface 32b of the second lens array 32 in the second optical path OP2). The first and second condenser lenses 35a and 35b are arranged at positions away from the second lens array 32, and diverging light from the second lens array 32 is incident on the first and second liquid crystal panels 61g and 61b at a large incident angle. Therefore, the focal lengths of the first and second condenser lenses 35a and 35b are reduced. As a result, it is possible to reduce the F-number and thus easily improve the brightness of illumination light.

Since the first and second condenser lenses 35a and 35b are biconvex lenses, it is possible to reduce spherical aberration. In addition, it is possible to freely set the position of the edge of the lens by adjusting the curvature of both lens surfaces. Therefore, flexibility in the setting of a mechanism for fixing the first and second condenser lenses 35a and 35b is improved. In addition, since the first and second condenser lenses 35a and 35b have aspheric lens surfaces, it is possible to effectively superimpose light beams, which results in an increase in the brightness of illumination light.

Second Embodiment

Next, a projector according to a second embodiment of the invention will be described. A projector 110 according to the second embodiment is similar to the projector 10 according to the first embodiment except that the structure of a portion thereof is changed. Therefore, a description of the same components as those in the first embodiment will be omitted.

Figure 3:
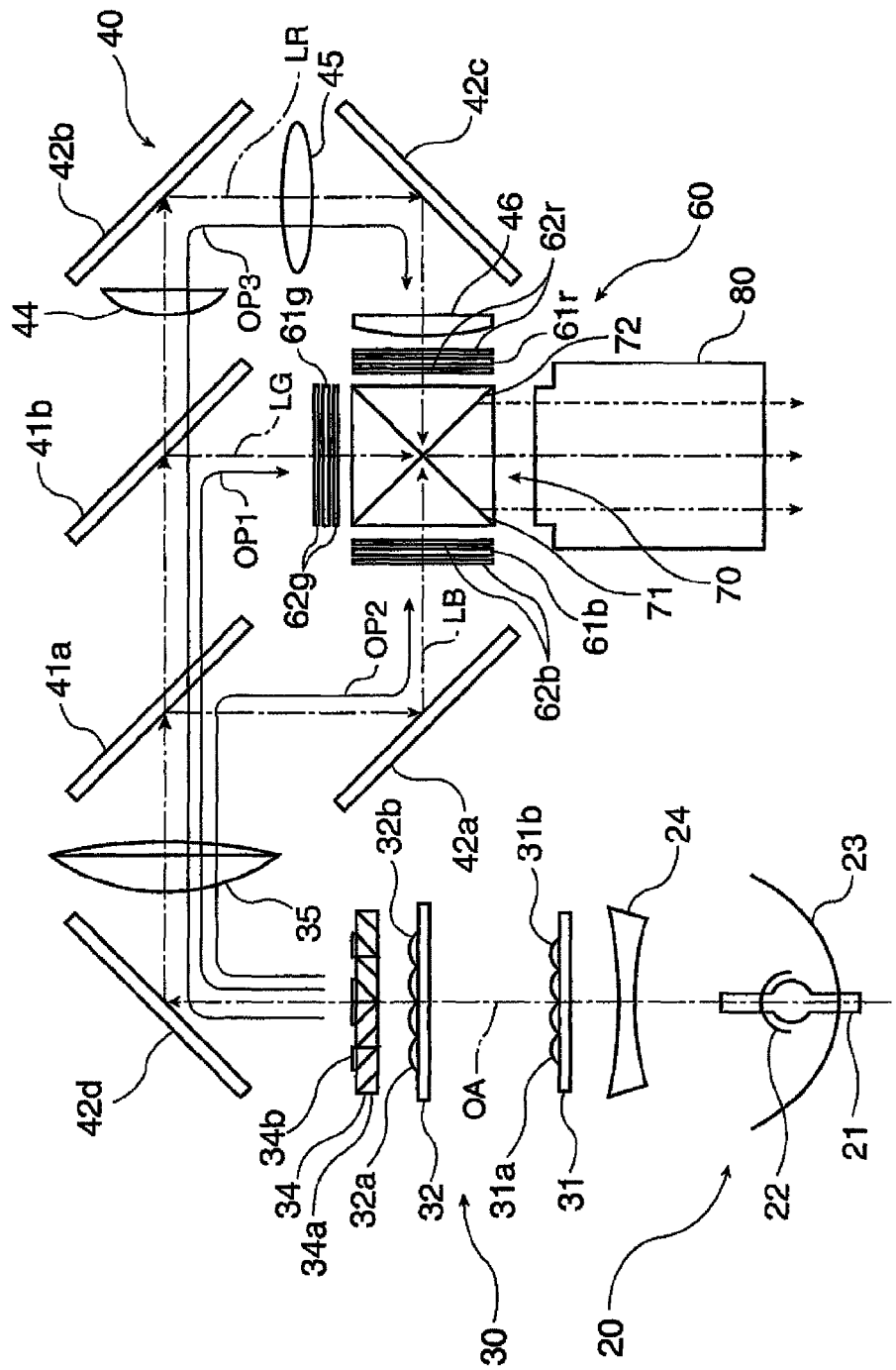
FIG. 3 is a conceptual diagram illustrating the structure of a projector according to a second embodiment of the invention.

FIG. 3 is a conceptual diagram illustrating the structure of an optical system of the projector 110 according to the second embodiment. In the projector 110 shown in FIG. 3, a color separation light guide optical system 40 includes a first-stage reflecting mirror 42d, a condenser lens 35, first and second dichroic mirrors 41a and 41b, a reflecting mirror 42a for blue, reflecting mirrors 42b and 42c for red, relay lenses 44 and 45, and a field lens 46. Among them, the first-stage reflecting mirror 42d, which is a first-stage reflecting mirror, reflects illumination light passing through the illumination optical system 30 to be guided to the color separation light guide optical system 40.

The condenser lens 35 is, for example, a biconvex lens having an aspheric surface on an incident side, similar to the first and second condenser lenses 35a and 35b according to the first embodiment. The condenser lens 35 has a function of superimposing divided light beams and a function of ensuring telecentricity.

The condenser lens 35 is provided between the first-stage reflecting mirror 42d and the first dichroic mirror 41a in the first and second optical paths OP1 and OP2 from the emission-side surface 32b of the second lens array 32 to the first and second liquid crystal panels 61g and 61b. In addition, no lens is provided between the emission-side surface 32b of the second lens array 32 and the first-stage reflecting mirror 42d or between the first dichroic mirror 41a and the first and second liquid crystal panels 61g and 61b. From another point of view, when a distance $L_1$ from the emission-side surface 32b of the second lens array 32 to the image forming region of the first liquid crystal panel 61g, that is, a light modulation surface of the first liquid crystal panel 61g, is divided into three equal parts and a distance from the emission-side surface 32b of the second lens array 32 to the image forming region of the second liquid crystal panel 61b, that is, a light modulation surface of the second liquid crystal panel 61b, is divided into three equal parts, the condenser lens 35 is disposed in the middle part (specifically, in the range of $(1/3)L_1$ to $(2/3)L_1$ and the range of $(1/3)L_2$ to $(2/3)L_2$).

Although the embodiments of the invention have been described above, the invention is not limited thereto, but various modifications and changes of the invention can be made without departing from the scope and spirit of the invention. For example, the following modifications can be made.

That is, in the projector 10 according to the above-described embodiment, the condenser lens 35a is an aspheric lens. However, the condenser lens 35a may be a spherical lens. When the condenser lens 35a is a spherical lens, it is possible to reduce manufacturing costs. For example, LAF2 (refractive index: 1.7) or EF2 (refractive index: 1.6) having low dispersion is used as the spherical lens. The condenser lens 35a is not limited to the biconvex lens, but it may be a plano-convex lens. When the condenser lens 35a is a plano-convex lens, it is possible to easily process the lens and thus reduce manufacturing costs.

In the projector 10 according to the above-described embodiment, the illumination optical system 30 includes the first and second lens arrays 31 and 32, the polarization converter 34, and the condenser lenses 35a, 35b and 35. However, for example, the first and second lens arrays 31 and 32 may be omitted, or they may be replaced with a rod integrator. In this case, for example, an incident-side surface of the rod integrator serves as a reference surface for the arrangement of the first condenser lens 35a.

In the projector 10 according to the above-described embodiment, the green light LG, the blue light LB, and the red light LR are guided to the first optical path OP1, the second optical path OP2, and the third optical path OP3, respectively. However, combinations of the color light components and the optical paths may be changed by changing the design of the first and second dichroic mirrors 41a and 41b of the color separation optical system. For example the green light LG or the blue light LB may be guided to the long third optical path OP3.

In the projector 10 according to the above-described embodiment, the first and second optical paths OP1 and OP2 have the same length, and the length of the third optical path OP3 is large. However, the length of each of the second and third optical paths OP2 and OP3 may be larger than that of the first optical path OP1.

In the projector 10 according to the above-described embodiment, illumination light is divided into three color light components and the three color light components are incident on the three liquid crystal panels 61g, 61b, and 61r. However, illumination light may be incident on one liquid crystal panel without being divided.

In the projector 10 according to the above-described embodiment, the image of the red light LR formed by the first condenser lens 35a is projected onto the third liquid crystal panel 61r through the relay lenses 44 and 45 and the field lens 46 with little change. However, for example, the image of the red light LR may be projected onto the third liquid crystal panel 61r without passing through the field lens 46. This is because only the relay lenses 44 and 45 enable the third optical path OP3 to use telecentricity obtained by the first condenser lens 35a.

The above-described embodiments of the invention can be applied to a front-projection projector that projects a projection image from an observer side and a rear-projection projector that projects a projection image from a side opposite to the observer side.

In the projector 10 according to the above-described embodiment, the cross dichroic prism 70 is used to separate or compose the illumination light components LG, LB, and LR. However, a cross dichroic mirror, which is another example of the light composition optical system, may be used.

What is claimed is:

1. A projector comprising:
a light source that emits light;
a first lens array that divides the light emitted from the light source into a plurality of partial light beams;
a second lens array that focuses the plurality of partial light beams emitted from the first lens array;
condenser lenses that superimpose the plurality of partial light beams emitted from the second lens array on target illumination regions, each of the condenser lenses being a single lens that achieves telecentric illumination when superimposing the partial light beams; and
liquid crystal panels that modulate the light beams passing through the condenser lenses according to image information, a single condenser lens from among the condenser lenses is arranged as the only lens on an optical path between the second lens array and at least one of the liquid crystal panels.

2. The projector according to claim 1, each of the condenser lenses being arranged in a middle part when the length of an optical path from an emission-side surface of the second lens array to a light modulation surface of each of the liquid crystal panels is divided into three equal parts.

3. The projector according to claim 1, each of the condense lenses being provided at a position spaced a distance of $(\frac{1}{3})L$ to $(\frac{2}{3})L$ from the emission-side surface of the second lens array, when L is a distance from the emission-side surface of the second lens array to the image formation surface of the corresponding liquid crystal panel.

4. The projector according to claim 1, further comprising:
a color separation light guide optical system including a first color separation mirror that separates the light beams emitted from the second lens array into a first color light component and other color light components, a second color separation mirror that separates other color light components into a second color light component and a third color light component, a first reflecting mirror that reflects the first color light component reflected by the first color separation mirror to bend an optical path, and second and third reflecting mirrors that reflect the third color light component passing through the second color separation mirror to bend an optical path, the condenser lenses being arranged between the first color separation mirror and the first reflecting mirror and between the first color separation mirror and the second color separation mirror.

5. The projector according to claim 1, further comprising:
a color separation light guide optical system including a first-stage reflecting mirror that reflects the light beams emitted from the second lens array to bend an optical path, a first color separation mirror that separates the light beams reflected by the first-stage reflecting mirror into a first color light component and other color light components, a second color separation mirror that separates other color light components into a second color light component and a third color light component, a first reflecting mirror that reflects the first color light component reflected by the first color separation mirror to bend an optical path, and second and third reflecting mirrors that reflect the third color light component passing through the second color separation mirror to bend an optical path, the condenser lens being arranged between the first-stage reflecting mirror and the first color separation mirror.

6. The projector according to claim 4, further comprising:
first, second, and third liquid crystal panels that respectively modulate the first, second, and third color light components separated by the color separation light guide optical system according to image information;
a light composition optical system that composes the images of the first, second, and third color light components modulated by the first, second, and third liquid crystal panels; and
a projection optical system that projects the image light composed by the light composition optical system.

7. The projector according to claim 4, the color separation light guide optical system further including a relay lens that is provided on the optical path of the third color light component having the largest length.

8. The projector according to claim 1, each of the condenser lenses being a biconvex lens.

9. The projector according to claim 1, each of the condenser lenses being an aspheric lens.

10. The projector according to claim 1, each of the condenser lenses being a spherical lens.

11. A projector comprising:
a light source that emits light;
a first lens array that divides the light emitted from the light source into a plurality of partial light beams;
a second lens array that focuses the plurality of partial light beams emitted from the first lens array;
a single condenser lens that superimposes the plurality of partial light beams emitted from the second lens array on target illumination regions, the condenser lens being a single lens that achieves telocentric illumination when superimposing the partial light beams; and
liquid crystal panels that modulate the light beams passing through the condenser lenses according to image information, the liquid crystal panels including a first liquid crystal panel and a liquid second crystal panel, the condenser lens arranged as the only lens between the second lens array and the first liquid crystal panel and the condenser lens arranged as the only lens on an optical path between the second lens array and the second liquid crystal panel.

12. The projector according to claim 11, the condenser lens being arranged in a middle part when the length of an optical path from an emission-side surface of the second lens array to a light modulation surface of each of the liquid crystal panels is divided into three equal parts.

13. The projector according to claim 11, the condense lenses being provided at a position spaced a distance of (⅓)L to (⅔)L from the emission-side surface of the second lens array, when L is a distance from the emission-side surface of the second lens array to the image formation surface of the first liquid crystal panel.

14. The projector according to claim 11, further comprising:
a color separation light guide optical system including
a first color separation mirror that separates the light beams emitted from the second lens array into a first color light component and other color light components,
a second color separation mirror that separates other color light components into a second color light component and a third color light component,
a first reflecting mirror that reflects the first color light component reflected by the first color separation mirror to bend an optical path, and
second and third reflecting mirrors that reflect the third color light component passing through the second color separation mirror to bend an optical path, the condenser lens being arranged between the second lens array and a first color separation mirror.

15. The projector according to claim 11, further comprising:
a color separation light guide optical system including
a first-stage reflecting mirror that reflects the light beams emitted from the second lens array to bend an optical path,
a first color separation mirror that separates the light beams reflected by the first-stage reflecting mirror into a first color light component and other color light components,
a second color separation mirror that separates other color light components into a second color light component and a third color light component,
a first reflecting mirror that reflects the first color light component reflected by the first color separation mirror to bend an optical path, and
second and third reflecting mirrors that reflect the third color light component passing through the second color separation mirror to bend an optical path, the condenser lens being arranged between the first-stage reflecting mirror and the first color separation mirror.

16. The projector according to claim 14,
the liquid crystal panels further including a third liquid crystal panel, the first, second, and third liquid crystal panels being respectively modulate the first, second, and third color light components separated by the color separation light guide optical system according to image information,
the projector further comprising:
a light composition optical system that composes the images of the first, second, and third color light components modulated by the first, second, and third liquid crystal panels; and
a projection optical system that projects the image light composed by the light composition optical system.

17. The projector according to claim 14, the color separation light guide optical system further including a relay lens that is provided on the optical path of the third color light component having the largest length.

18. The projector according to claim 11, the condenser lens being a biconvex lens.

19. The projector according to claim 11, the condenser lens being an aspheric lens.

20. The projector according to claim 11, the condenser lens being a spherical lens.

* * * * *